May 7, 1963 F. OSTREM 3,088,482
VENT VALVE
Filed June 23, 1961

INVENTOR.
Fred Ostrem
BY
ATTORNEYS

United States Patent Office 3,088,482
Patented May 7, 1963

3,088,482
VENT VALVE
Fred Ostrem, Park Ridge, Ill., assignor to The Dole Valve Company, Morton Grove, Ill., a corporation of Illinois
Filed June 23, 1961, Ser. No. 119,187
2 Claims. (Cl. 137—200)

This invention relates to fluid control valves and is more particularly directed to an improved vent valve of the type which is employed to vent trapped air from hot water radiators and the like.

It is well known in the art that it is desirable to provide a means for venting trapped air from a hot water radiator. Obviously however it is not desirable to permit the flow of water from the radiator. Manual means have been incorporated into most hot water radiator systems so that the operator can manually open a valve to permit the escape of trapped air. As soon as water begins to flow out of the valve the operator shuts the valve off.

Automatic vent valves have been devised which are effective to permit the flow of air therethrough but which will not permit the flow of any substantial amount of liquid therethrough. These vent valves generally employ hygroscopic members which permit the free flow of air therethrough but which will swell and seal themselves shut upon exposure to water. Thus, when water begins to flow through the member, the member seals and prevents further flow of water therethrough. If the water level within the radiator to which the vent valve is connected should, for any reason, recede from the vent valve so that the hygroscopic member is not subjected to the presence of the liquid, the air will dry the hygroscopic member and it will open up sufficiently to permit the free flow of air therethrough in a manner which is well known in the art.

The present invention is directed to an improvement in vent valves employing such a hygroscopic member. Recession of the water within the radiator from the vent valve may create a partial vacuum in the water evacuated portion of the radiator and vent valve since fluid cannot pass through the hygroscopic member while it is still damp from exposure to water. When the hygroscopic member dries and opens sufficiently to permit the passage of air therethrough, air will be drawn into the water evacuated portion of the radiator and may cause malfunction of the heating system. For instance, water pumps in the system could become "air bound" or cavitate causing them to run excessively and/or continuously.

In order to obviate such disadvantages, I have devised a vent valve structure which incorporates a hygroscopic member to provide automatic means for venting the radiator but which will be effective to prevent the seepage of water from the valve and yet which incorporates a check valve which will be effective to prevent the retrograde flow of air back into the radiator.

In addition, I have so designed the valve that it can be manually closed if desired by manually adjusting an element which will hold the check valve member in its seated position.

From the foregoing it will be understood that a principal object of my invention is to provide an improved form of vent valve for venting trapped air from a hot water radiator.

More specifically, it is an object of my invention to provide a vent valve structure employing a hygroscopic member which includes means for preventing the retrograde flow of air into the valve.

These and other objects of my invention will become apparent from time to time as the following specification proceeds and with reference to the accompanying drawings, wherein.

Figure 1:
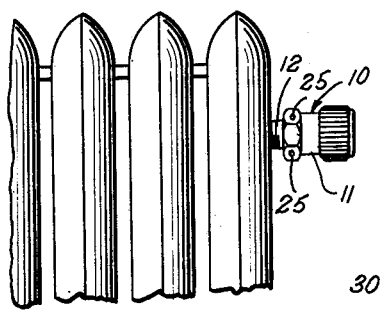
FIGURE 1 is a side elevatitonal view of a vent valve constructed in accordance with the principles of my invention which shows that valve mounted on a hot water radiator.

The vent valve shown in the drawings comprises generally a casing 10 which includes a hollow cup shaped member 11 having an externally threaded boss 12 formed integrally therewith which has an inlet bore 13 extending axially therethrough. The opposite end of the member 11 is internally threaded as at 14 and receives a threaded fitting 15 which, in turn, has a bore 16 extending axially therethrough in coaxial alignment with the bore 13. An annular raised portion 17 of the member 11 supports a plurality of hygroscopic washers 18 and these washers are sandwiched between this raised portion 17 and the fitting 15 so that their hollow interiors are positioned in registry with one another and in axial alignment with the bores 13 and 16.

The hygroscopic members 18 are of a type which are well known in the art and which permit the free passage of air therethrough when they are in a dry state but which, when exposed to water, become impervious to water. Such members are often employed in vent valve structures since they will permit trapped air to escape from the radiator but will not permit any appreciable seepage of liquid from the radiator.

It will be observed that a recessed portion 19 of the member 11 is formed adjacent a port 20 formed at the innermost end of the bore 13 and that this recess, in combination with the hollow interior portions of the hygroscopic washers 18, defines an enlarged fluid chamber 21. A port 22 is formed at the innermost end of the bore 16 and opens to the chamber 21. Laterally extending bores 23 and 24 are formed within the fitting 15 and are formed through a diametrically reduced portion of the fitting 15 so that their outer ends terminate in spaced relationship to the inner wall of the member 11. A plurality of ports 25 extend through the wall of the member 11 and communicate the interior of the casing with the atmosphere. Consequently, fluid can flow through the port 13 and into the chamber 21 and thence through bores 16 and 23 or 24 into the interior of the casing and can then escape from the casing through the ports 25.

As shown in FIGURE 1, the vent valve can be mounted on a normal hot water radiator by threadedly mounting the threaded boss 12 within a complementary opening in the radiator so that air trapped within the radiator can escape through the valve in the manner described. Still further, as long as the hygroscopic members 18 are in a dry state, air can pass from one radiator into the chamber 21 within the vent valve and thence through the hygroscopic members 18 to the ports 25.

A valve stem 26 is threadedly mounted within the bore 16 and has a valve face 27 formed on the innermost end thereof which is cooperable with a shoulder 28 surrounding the port 22 to control the flow of fluid through that port. The stem 26 is relieved as at 29 so that when the valve face 27 is unseated from the shoulder 28 fluid can freely flow around the valve face and between the wall of the bore 16 and the relieved portion 29 and thence through the bores 23 and 24. The relative position of the valve face 27 relative to the shoulder 28 can be manually determined as desired by rotation of a suitable adjusting knob 30 which can be keyed to or made integral with the valve stem 26 in any well known manner.

Figure 2:
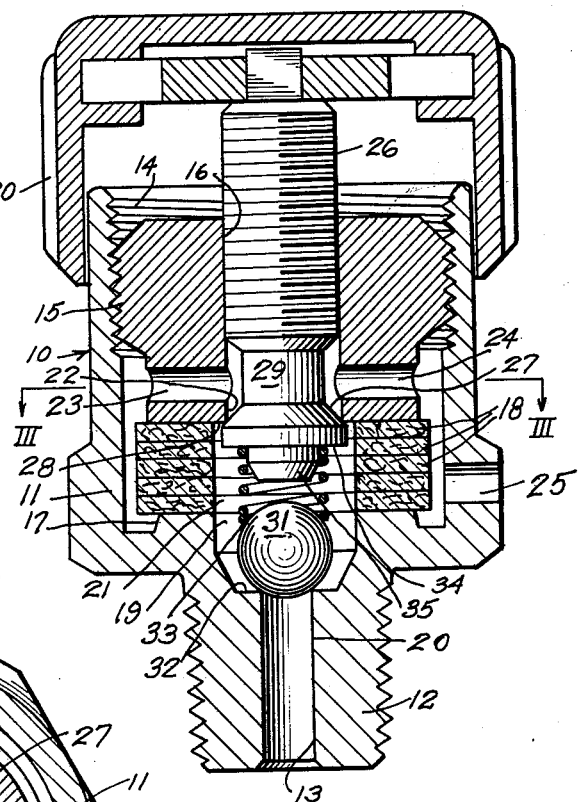
FIGURE 2 is a vertical sectional view through the vent valve illustrated in FIGURE 1.
Figure 3:
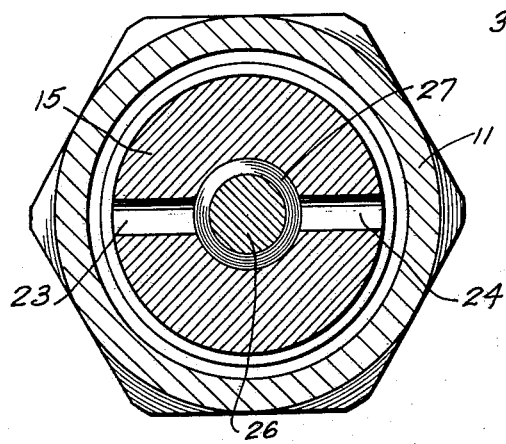
FIGURE 3 is a horizontal sectional view through the vent valve which is taken along line III—III of FIGURE 2.

When the valve face 27 is seated on the shoulder 28 as is shown in FIGURE 2, air can flow from the radiator into the chamber 21 and thence through the hygroscopic washers 18 and can escape from the valve through ports 25. As soon as liquid begins to flow into the chamber 21 and to contact the hygroscopic washers, however, the washers will become impervious to liquid and there will be no further liquid flow from the chamber 21 to the ports 25. In prior types of devices recession of the water from the equivalent to the chamber 21 has permitted the washers 18 to dry and a retrograde flow of air to the radiator systems was permitted resulting in the objectionable results heretofore mentioned.

In addition to providing manually adjustable means for bypassing fluid around the hygroscopic washers, I have incorporated a check valve into the system to prevent the retrograde flow of air. As shown in FIGURE 2, I have employed a ball valve 31 in the recess 19 which is cooperable with an annular shoulder 32 surrounding the port 20 to control the flow of fluid through that port. The ball valve 31 is biased into a seated position by a compression spring 33 which is interposed between the ball valve 31 and an annular seating surface 34 on the inner end of the valve stem 26. In order to properly position the spring 33, the valve stem 26 has a depending boss 35 formed integrally therewith which serves as a guide post for one end of the spring 33. It will be observed that the ball valve 31 and the innermost end of the boss 35 are spaced apart a sufficient distance so that the valves cooperable with shoulders 28 and 32 can both be unseated at the same time to permit the free flow of fluid from the bore 13 to the bore 16. Conversely, it will be observed that the valve stem 26 can be moved to a position such that the innermost end of the boss 35 will engage the ball valve 31 to hold that valve in its seated position on the shoulder 32, thus providing a manual shut-off for the vent valve.

From the foregoing it will be understood that I have provided a vent valve which will be effective to automatically vent trapped air from a hot water radiator but which will not permit any substantial amount of liquid seepage and yet which will be effective to absolutely prevent retrograde fluid flow from the atmosphere back into the radiator system. Still further, I have devised a valve which includes the above feature and yet which also includes means for bypassing the hygroscopic washers if and when such bypass is desirable. These objectives have been achieved in a valve of simple construction and extremely low cost.

It will further be understood that this embodiment of the invention has been used for illustrative purposes only and that various modifications and variations in the invention may be effected without departing from the spirit and scope of the novel concepts thereof.

I claim as my invention:

1. A vent valve for venting trapped air from a hot water radiator which comprises: a casing having inlet and outlet ports, a bore formed within said casing coaxially with said inlet port, a valve chamber immediate said ports and communicable therewith, a shoulder of said casing defining said inlet port and opening to said chamber, a passage leading from said chamber to said outlet port, a hygroscopic member positioned within said passage to permit air flow but to prevent liquid flow therethrough, a bypass port formed within said casing coaxially with said inlet port and opening to said chamber, a bypass passageway communicating said bypass port with said outlet port and bypassing said passage and said member, a shouldered portion of said casing defining said bypass port facing toward said shoulder defining said inlet port, a poppet valve cooperable with said shouldered portion and having a stem guided within said bore for controlling fluid flow through said bypass port, means for adjusting the position of said poppet valve relative to said port, a valve member cooperable with said shoulder to control fluid flow through said inlet port, and spring means interposed between said poppet valve and said valve member to bias said valve member toward said shoulder.

2. A vent valve for venting trapped air from a hot water radiator which comprises: a casing having inlet and outlet ports, a bore formed within said casing coaxially with said inlet port, a valved chamber intermediate said ports and communicable therewith, a shoulder of said casing defining said inlet port opening to said chamber, a passage leading from said chamber to said outlet port, a hygroscopic member positioned within said passage to permit air flow but to prevent liquid flow therethrough, a bypass port formed within said casing coaxially with said inlet port and opening to said chamber, a bypass passageway communicating said bypass port with said outlet port and bypassing said passage and said member, a shouldered portion of said casing defining said bypass port facing toward said shoulder defining said inlet port, a poppet valve cooperable with said shouldered portion and having a stem guided within said bore for controlling fluid flow through said bypass port, means for adjusting the position of said poppet valve relative to said port, a valve member cooperable with said shoulder to control fluid flow through said inlet port, spring means interposed between said poppet valve and said valve member to bias said valve member toward said shoulder, means forming an extension from said poppet valve engageable with said valve member in one position of said poppet valve to maintain said poppet valve in a seated position on said shoulder to prevent fluid flow through said inlet port.

References Cited in the file of this patent

UNITED STATES PATENTS

| | | |
|---|---|---|
| 935,808 | Parker | Oct. 5, 1909 |
| 1,749,120 | Buss | Mar. 4, 1930 |
| 2,845,080 | Kraft | July 29, 1955 |